(12) United States Patent
Ito et al.

(10) Patent No.: US 9,180,867 B2
(45) Date of Patent: Nov. 10, 2015

(54) DRIVE CONTROL APPARATUS OF HYBRID VEHICLE

(75) Inventors: Yoshiki Ito, Hamamatsu (JP); Masaaki Tagawa, Hamamatsu (JP); Masakazu Saito, Hamamatsu (JP); Hitoshi Ohkuma, Hamamatsu (JP)

(73) Assignee: SUZUKI MOTOR CORPORATION, Hamamatsu-shi, Shizuoka (JP)

( * ) Notice: Subject to any disclaimer, the term of this patent is extended or adjusted under 35 U.S.C. 154(b) by 190 days.

(21) Appl. No.: 13/983,185

(22) PCT Filed: Feb. 4, 2011

(86) PCT No.: PCT/JP2011/052373
§ 371 (c)(1),
(2), (4) Date: Nov. 11, 2013

(87) PCT Pub. No.: WO2012/105044
PCT Pub. Date: Aug. 9, 2012

(65) Prior Publication Data
US 2014/0058603 A1 Feb. 27, 2014

(51) Int. Cl.
*B60L 9/00* (2006.01)
*B60L 11/00* (2006.01)
*G05D 1/00* (2006.01)
(Continued)

(52) U.S. Cl.
CPC .............. *B60W 20/10* (2013.01); *B60K 6/445* (2013.01); *B60W 10/06* (2013.01); *B60W 10/08* (2013.01); *B60W 10/26* (2013.01); *B60W 20/00* (2013.01); *B60W 30/1882* (2013.01); *B60W 2710/0666* (2013.01); *B60W 2710/083* (2013.01); *B60W 2710/248* (2013.01); *F16H 2037/102* (2013.01); *Y02T 10/6239* (2013.01); *Y02T 10/6286* (2013.01); *Y10S 903/93* (2013.01)

(58) Field of Classification Search
CPC .................. H02P 5/00; B60W 20/10
USPC ................................................ 318/51; 701/22
See application file for complete search history.

(56) References Cited

U.S. PATENT DOCUMENTS 7,609,011 B2  10/2009  Yatabe et al.
2008/0297073 A1*  12/2008  Yatabe et al. ................... 318/51

FOREIGN PATENT DOCUMENTS

JP      2004-138158 A       5/2004
JP      2004138158 A   *    5/2004
(Continued)

OTHER PUBLICATIONS

English Translation for JP2008-012992.*
(Continued)

*Primary Examiner* — Helal A Algahaim
*Assistant Examiner* — Mahmoud Ismail
(74) *Attorney, Agent, or Firm* — Flynn, Thiel, Boutell & Tanis, P.C.

(57) ABSTRACT

A drive control apparatus of a hybrid vehicle, in which a motor torque instruction value operator of controller calculates a torque instruction value of each of a plurality of motor generators by using a torque balance equation including a target engine torque which is obtained from a target engine operation point and an electric power balance equation including a target charge/discharge power. Thus, control of the plurality of motor generators in the case where there is a charge/discharge to/from a battery can be performed, and both of assurance of a target drive force and assurance of a target charge/discharge can be satisfied in consideration of an operation point of an internal combustion engine (engine operation point).

1 Claim, 10 Drawing Sheets

(51) Int. Cl.
 *G05D 3/00* (2006.01)
 *G06F 7/00* (2006.01)
 *G06F 17/00* (2006.01)
 *B60W 20/00* (2006.01)
 *B60K 6/445* (2007.10)
 *B60W 10/06* (2006.01)
 *B60W 10/08* (2006.01)
 *B60W 10/26* (2006.01)
 *B60W 30/188* (2012.01)
 *F16H 37/10* (2006.01)

(56) References Cited

FOREIGN PATENT DOCUMENTS

| JP | 2004-262275 A | 9/2004 |
| JP | 2006-50704 A | 2/2006 |
| JP | 2007-22483 A | 2/2007 |
| JP | 2007022483 A * | 2/2007 |
| JP | 2008-12992 A | 1/2008 |
| JP | 2008012992 A * | 1/2008 |

OTHER PUBLICATIONS

English Translation for JP2007-022483.*
English Translation for JP2004-138158.*
Form PCT/ISA/210 International Search Report issued in International Application No. PCT/JP2011/052373 with English translation, date of mailing Apr. 12, 2011 (5 pages).

* cited by examiner

CALCULATION OF MOTOR TORQUE INSTRUCTION VALUE

ARITHMETIC OPERATION OF TARGET ENGINE OPERATION POINT

ARITHMETIC OPERATION OF MOTOR TORQUE INSTRUCTION VALUE

TARGET DRIVE FORCE RETRIEVAL MAP

TARGET CHARGE/DISCHARGE POWER RETRIEVAL TABLE

COLLINEAR DIAGRAM IN THE CASE WHERE VEHICLE SPEED IS CHANGED AT THE SAME ENGINE OPERATION POINT

EACH EFFICIENCY ON EQUAL POWER LINE

COLLINEAR DIAGRAM OF EACH POINT (D, E, F) ON EQUAL POWER LINE

COLLINEAR DIAGRAM OF STATE WHERE MOTIVE POWER CIRCULATION HAS OCCURRED

DRIVE CONTROL APPARATUS OF HYBRID VEHICLE

TECHNICAL FIELD

The invention relates to a drive control apparatus of a hybrid vehicle and, more particularly, to a drive control apparatus of a hybrid vehicle which has a plurality of motive power sources and synthesizes motive powers by a power transmission mechanism and inputs/outputs to/from a drive axis, wherein an operation point of an internal combustion engine (engine operation point) and a torque (motor torque) are controlled.

BACKGROUND ART

As a vehicle, there is a hybrid vehicle for driving and controlling a vehicle by using outputs from an internal combustion engine and a plurality of motor generators (electric motors) as drive sources.

As such a hybrid vehicle, there are a series system (the internal combustion engine is used only to rotate the power generator and the whole driving is performed by the motor generators) and a parallel system (the internal combustion engine and the motor generator are arranged in parallel and their motive powers are used for driving).

In the hybrid vehicle, as another system of the series system and the parallel system, there is such a system that as a power transmission mechanism of a triaxial type, a motive power of an internal combustion engine is divided to a power generator and a drive axis by using one planetary gear mechanism (differential gear mechanism having three rotational elements) and two motor generators (first motor generator: MG1, second motor generator: MG2) as a motor generator and the motor generator provided for a drive axis is driven by using an electric power generated by the power generator, thereby torque converting the motive power of the internal combustion engine (the Official Gazette of Japanese Patent No. 3050125, the Official Gazette of Japanese Patent No. 3050138, the Official Gazette of Japanese Patent No. 3050141, the Official Gazette of Japanese Patent No. 3097572).

Thus, in the hybrid vehicle, the operation point of the internal combustion engine (engine operation point) can be set to an arbitrary point where a stop is included and fuel consumption is improved.

CITATION LIST

Patent Literature

PTL1: The Official Gazette of JP-A-2008-12992

In a drive control apparatus of a hybrid vehicle according to Patent Literature 1, in the case of a same engine power, the higher a vehicle speed is, the higher an engine rotational speed at a target engine operation point is.

SUMMARY OF INVENTION

Technical Problem

In the related art, in a hybrid vehicle, although not particularly similar to the series system, since a motor generator having a relatively large torque is necessary in order to obtain a sufficient torque of a drive axis and a transmission/reception amount of an electric power between the power generator and the motor generator increases in a LOW gear ratio range, an electrical loss increases and there is still room for improvement.

As a method of solving such a point, as a power transmission mechanism of a quadruple type, there is such a structure that an output axis of an internal combustion engine, a first motor generator, a second motor generator, and a drive axis connected to a drive wheel are connected to each rotational element of the power transmission mechanism (differential gear mechanism) having four rotational elements and a motive power of the internal combustion engine and motive powers of the first motor generator and the second motor generator are synthesized and output to the drive axis. The output axis of the internal combustion engine and the drive axis are arranged to the inside rotational elements on a collinear diagram and the first motor generator on the internal combustion engine side and the second motor generator on the drive axis side are arranged to the outside rotational elements on a collinear diagram, thereby decreasing a ratio of the motive powers which are transmitted by the first and second motor generators in the motive power which is transmitted from the internal combustion engine to the drive axis, miniaturizing the first and second motor generators, and improving a transmission efficiency as a driving apparatus (the Official Gazette of JP-A-2004-15982, the Official Gazette of JPA-2002-281607).

As a power transmission mechanism of the quadruple type, there is such a structure that a method similar to that of the foregoing structure is used and, further, the fifth rotational element is added and a brake for stopping a rotation of the fifth rotational element is provided (the Official Gazette of Japanese Patent No. 3578451).

In the foregoing power transmission mechanism of the triaxial type disclosed in the Official Gazette of Japanese Patent No. 3050125, by adding a drive force which is required for the vehicle and the electric power which is required to charge a battery, a power to be generated by the internal combustion engine is calculated, and a point where an efficiency is as high as possible is calculated from a combination of a torque serving as such a power and an engine rotational speed and is used as a target engine operation point. The first motor generator is driven and controlled so that the engine operation point becomes the target engine operation point, thereby controlling the engine rotational speed.

However, in the case of the power transmission mechanism of the triaxial type, since the torque of the second motor generator does not exert an influence on a torque balance, the torque of the first motor generator is determined only by the engine torque and it is sufficient to obtain the torque of the second motor generator so that a drive force becomes a target value. However, in the case of the quadruple type, the torque of the second motor generator also exerts an influence on the torque balance and exerts an influence on the control of the engine rotational speed. Therefore, there is such an inconvenience that the control method of the foregoing triaxial type cannot be used.

In the case of the foregoing power transmission mechanism of the quadruple type disclosed in the Official Gazette of JP-A-2004-15982, the torques of the first motor generator and the second motor generator in the case where the vehicle runs in a state where there is no charge/discharge to/from a battery are calculated from a torque balance equation, the engine rotational speed is feedback controlled, and the engine rotational speed and the drive force are controlled. However, nothing is mentioned about the case where there is a charge/discharge to/from the battery.

According to the foregoing cited literature 1, in the hybrid system having the internal combustion engine and a plurality of motor generators, the engine rotational speed is set to be high with regard to the engine operation point, and the control technique of the internal combustion engine is disclosed. However, the control of a plurality of motor generators is obscure and, further, the control of a plurality of motor generators in the case of performing the charge/discharge to/from the battery is obscure. It is also necessary that the internal combustion engine and a plurality of motor generators are mechanically and operationally coupled and a plurality of motor generators are controlled with a good torque balance so as to be mutually associated while maintaining the engine operation point to the target value. Further, in the case of performing the charge/discharge to/from the battery, it is necessary to also balance electric power income and expenses. It is, therefore, necessary to control so as to satisfy both of them and the improvement is demanded.

It is, therefore, an object of the invention to provide a drive control apparatus of a hybrid vehicle having an internal combustion engine and a plurality of motor generators, wherein it is possible to attain control of the plurality of motor generators in the case where there is a charge/discharge to/from a battery in the hybrid vehicle and satisfy both of an assurance of a target drive force and assurance of a target charge/discharge in consideration of an operation point of the internal combustion engine (engine operation point).

Solution to Problem

According to the invention, there is provided a drive control apparatus of a hybrid vehicle for driving and controlling a vehicle by using outputs from an internal combustion engine and a plurality of motor generators, comprising: accelerator opening degree detecting means for detecting an accelerator opening degree; vehicle speed detecting means for detecting a vehicle speed; battery charge state detecting means for detecting a charge state of a battery; target drive power setting means for setting a target drive power on the basis of the accelerator opening degree detected by the accelerator opening degree detecting means and the vehicle speed detected by the vehicle speed detecting means; target charge/discharge power setting means for setting a target charge/discharge power on the basis of at least the charge state of the battery detected by the battery charge state detecting means; target engine power calculating means for calculating a target engine power from the target drive power set by the target drive power setting means and the target charge/discharge power set by the target charge/discharge power setting means; target engine operation point setting means for setting a target engine operation point from the target engine power calculated by the target engine power calculating means and a whole system efficiency; and a motor torque instruction value operating means for setting a torque instruction value of each of the plurality of motor generators, wherein the motor torque instruction value operating means calculates the torque instruction value of each of the plurality of motor generators by using a torque balance equation including a target engine torque which is obtained from the target engine operation point and an electric power balance equation including the target charge/discharge power.

Advantageous Effects of Invention

According to the drive control apparatus of the hybrid vehicle of the invention, in the hybrid vehicle having the internal combustion engine and the plurality of motor generators, control of the plurality of motor generators in the case where there is the charge/discharge to/from the battery can be attained and both of the assurance of the target drive force and the assurance of the target charge/discharge can be satisfied in consideration of the operation point of the internal combustion engine (engine operation point).

DESCRIPTION OF EMBODIMENTS

According to the invention, such an object that in a hybrid vehicle having an internal combustion engine and a plurality of motor generators, control of the plurality of motor generators in the case where there is a charge/discharge to/from a battery is attained and both an assurance of a target drive force and assurance of a target charge/discharge are satisfied in consideration of an operation point of the internal combustion engine (engine operation point) are realized by calculating a torque instruction value of each of the plurality of motor generators by using a torque balance equation including a target engine torque which is obtained from the target engine operation point and an electric power balance equation including the target charge/discharge power.

Embodiments

FIGS. 1 to 16 show an embodiment of the invention.

Figure 1:
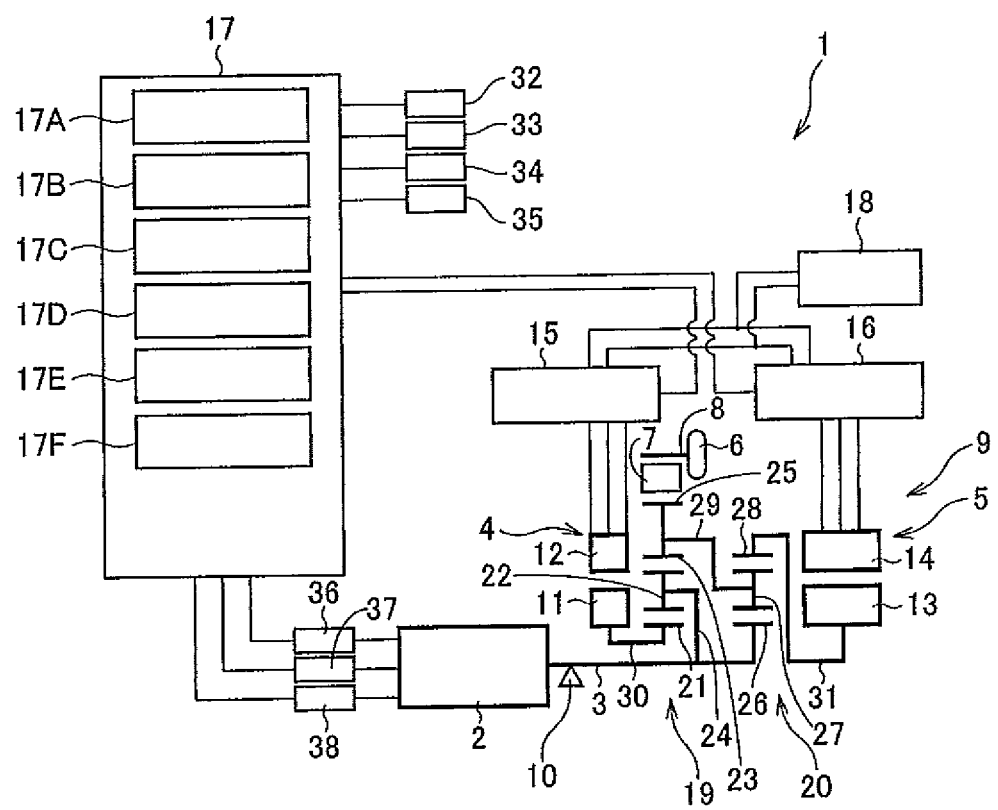
FIG. 1 is a system constructional diagram of a drive control apparatus of a hybrid vehicle. (Embodiment)

In FIG. 1, reference numeral 1 denotes a drive control apparatus of a hybrid vehicle as an electric vehicle.

The drive control apparatus 1 has: an output axis 3 of an internal combustion engine (referred to as "ENG" in the diagram) 2 serving as a drive source for outputting a torque; a first motor generator (referred to as "MG1" in the diagram) 4 and a second motor generator (referred to as "MG2" in the diagram) 5 serving as a plurality of motor generators (electric motors); a drive axis (referred to as "OUT" in the diagram) 8 connected to a drive wheel 6 through an output transfer mechanism 7; and a power transmission mechanism (differential gear mechanism) 9 coupled with the output axis 3 of the internal combustion engine 2, the first motor generator 4, the second motor generator 5, and the drive axis 8, respectively.

On the internal combustion engine 2 side, a one-way clutch 10 is provided on the way of the output axis 3 of the internal combustion engine 2. The one-way clutch 10 is provided to prevent the internal combustion engine 2 from rotating reversely. When the EV (electric vehicle) runs, the one-way clutch 10 receives a torque reaction of the second motor generator 5.

The first motor generator 4 is constructed by a first rotor 11 and a first stator 12. The second motor generator 5 is constructed by a second rotor 13 and a second stator 14.

The drive control apparatus 1 has: a first inverter 15 for operating and controlling the first motor generator 4; a second inverter 16 for operating and controlling the second motor generator 5; and control means (drive control unit: ECU) 17 coupled with the first inverter 15 and the second inverter 16.

The first inverter 15 is connected to the first stator 12 of the first motor generator 4. The second inverter 16 is connected to the second stator 14 of the second motor generator 5.

A power source terminal of each of the first inverter 15 and the second inverter 16 is connected to a battery (high-voltage battery for driving) 18. The battery 18 can supply and receive an electric power to/from the first motor generator 4 and the second motor generator 5.

The drive control apparatus 1 drives and controls the hybrid vehicle by using outputs from the internal combustion engine, the first motor generator 4, and the second motor generator 5.

The power transmission mechanism 9 is what is called a power input/output apparatus of a quadruple type and is constructed as follows. The output axis 3 of the internal combustion engine 2 and the drive axis 8 are arranged. The first motor generator 4 on the internal combustion engine 2 side and the second motor generator 5 on the drive axis 8 side are arranged. A motive power of the internal combustion engine 2, a motive power of the first motor generator 4, and a motive power of the second motor generator 5 are synthesized and output to the drive axis 8. The motive powers are transmitted and received between the internal combustion engine 2 and the first motor generator 4, second motor generator 5, and drive axis 8.

The power transmission mechanism 9 is constructed in such a manner that a first planetary gear mechanism 19 and a second planetary gear mechanism 20, whose two rotational elements are coupled, are arranged in parallel.

The first planetary gear mechanism 19 has: a first sun gear 21; a first pinion gear 22 engaged with the first sun gear 21; a first ring gear 23 engaged with the first pinion gear 22; a first carrier 24 coupled with the first pinion gear 22; and an output gear 25 coupled with the first ring gear 23.

The second planetary gear mechanism 20 has: a second sun gear 26; a second pinion gear 27 engaged with the second sun gear 26; a second ring gear 28 engaged with the second pinion gear 27; and a second carrier 29 coupled with the second pinion gear 27.

In the power transmission mechanism 9, the first carrier 24 of the first planetary gear mechanism 19 is coupled with the output axis 3 of the internal combustion engine 2, and the second carrier 29 of the second planetary gear mechanism 20 is coupled with the first ring gear 23 and the output gear 25 of the first planetary gear mechanism 19.

The first rotor 11 of the first motor generator 4 is connected to the first sun gear 21 through a first motor output axis 30.

The output axis 3 of the internal combustion engine 2 is connected to the first carrier 24 and the second sun gear 26. The drive axis 8 is connected to the first ring gear 23 and the second carrier 29 through the output gear 25 and the output transfer mechanism 7. The second rotor 13 of the second motor generator 5 is connected to the second ring gear 28 through a second motor output axis 31.

The second motor generator 5 can be directly coupled with the drive wheel 6 through the second motor output axis 31, second ring gear 28, second carrier 29, first ring gear 23, output gear 25, output transfer mechanism 7, and drive axis 8 and has a performance for enabling the vehicle to run only by a single output.

That is, in the power transmission mechanism 9, the first carrier 24 of the first planetary gear mechanism 19 and the second sun gear 26 of the second planetary gear mechanism 20 are coupled and connected to the output axis 3 of the internal combustion engine 2, and the first ring gear 23 of the first planetary gear mechanism 19 and the second carrier 29 of the second planetary gear mechanism 20 are coupled and connected to the drive axis 8, the first motor generator 4 is connected to the first sun gear 21 of the first planetary gear mechanism 19, the second motor generator 5 is connected to the second ring gear 28 of the second planetary gear mechanism 20, and the motive powers are transmitted and received between the internal combustion engine 2 and the first motor generator 4, second motor generator 5, and drive axis 8.

Accelerator opening degree detecting means 32 for detecting a depression amount of an accelerator pedal as an accelerator opening degree, vehicle speed detecting means 33 for detecting a vehicle speed, battery charge state detecting means 34 for detecting a state of charge (SOC) of the battery 18, and engine rotational speed detecting means 35 for detecting an engine rotational speed are connected to the control means 17.

An air amount adjusting mechanism 36, a fuel supplying mechanism 37, and an ignition timing adjusting mechanism 38 are connected to the control means 17 so as to control the internal combustion engine 2.

Figure 4:
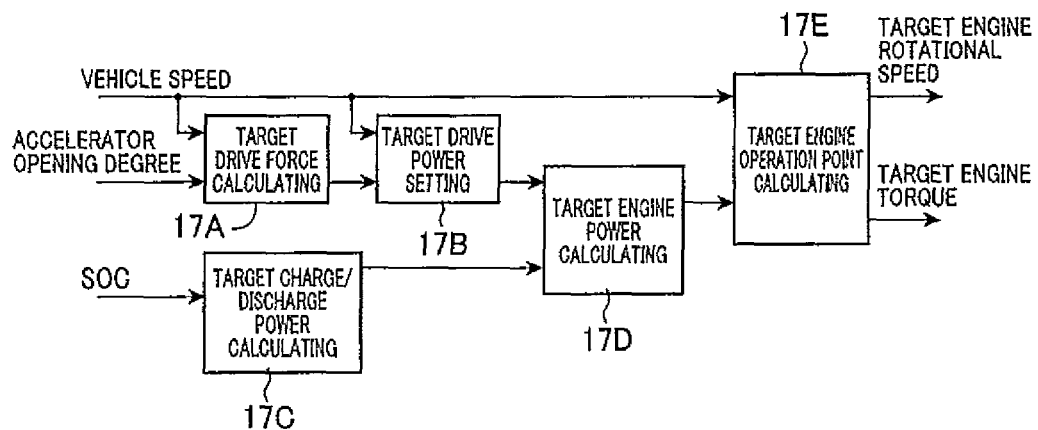
FIG. 4 is a control block diagram for calculating the target engine operation point. (Embodiment)

As shown in FIGS. 1 and 4, the control means 17 has: target drive force calculating means 17A; target drive power setting means 17B; target charge/discharge power setting means 17C; target engine power calculating means 17D; target engine operation point setting means 17E; and motor torque instruction value operating means 17F.

The target drive force calculating means 17A calculates a target drive force on the basis of the accelerator opening degree detected by the accelerator opening degree detecting means 32 and the vehicle speed detected by the vehicle speed detecting means 33.

The target drive power setting means 176 sets a target drive power on the basis of the accelerator opening degree detected by the accelerator opening degree detecting means 32 and the vehicle speed detected by the vehicle speed detecting means 33.

The target charge/discharge power setting means 17C sets a target charge/discharge power on the basis of at least a charge state of the battery 18 detected by the battery charge state detecting means 34.

The target engine power calculating means 17D calculates a target engine power from the target drive power set by the target drive power setting means 17B and the target charge/discharge power set by the target charge/discharge power setting means 17C.

The target engine operation point setting means 17E sets a target engine operation point from the target engine power calculated by the target engine power calculating means 17D and the whole system efficiency.

The motor torque instruction value operating means 17F sets a torque instruction value of each of the first motor generator 4 and the second motor generator 5 serving as a plurality of motor generators.

Figure 6:
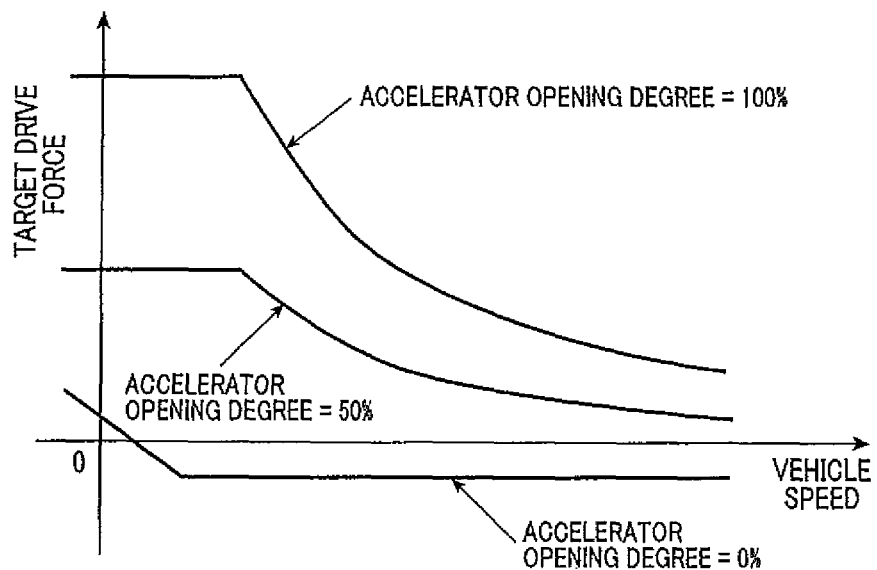
FIG. 6 is a diagram showing a target drive force retrieval map. (Embodiment)

As shown in FIG. 6, the target drive force calculating means 17A has a target drive force retrieval map.

Figure 7:
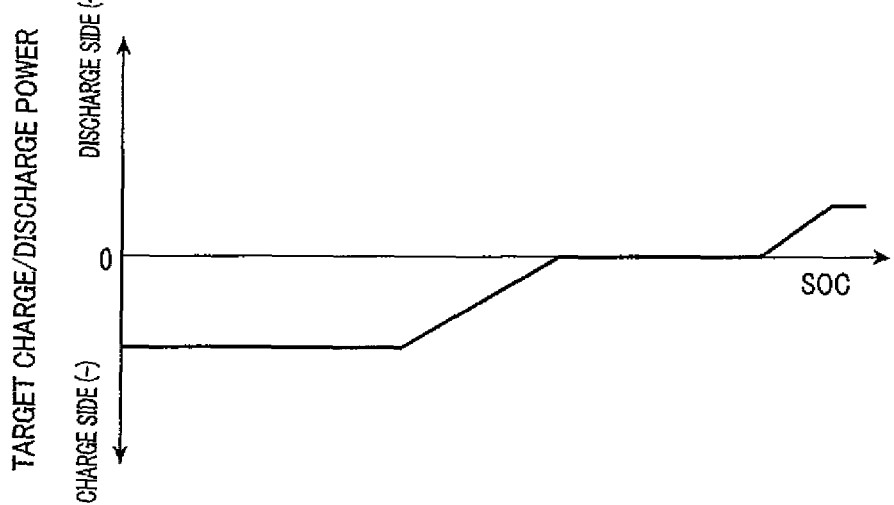
FIG. 7 is a diagram showing a target charge/discharge power retrieval table. (Embodiment)

As shown in FIG. 7, the target charge/discharge power setting means 17C has a target charge/discharge power retrieval table.

Figure 8:
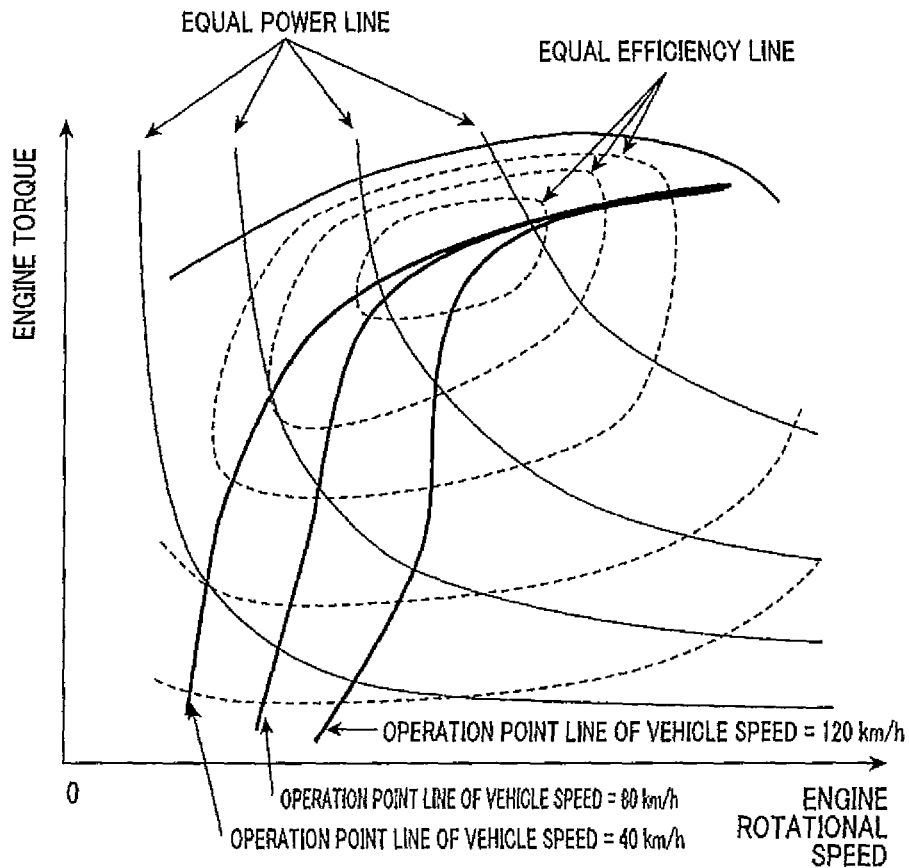
FIG. 8 is a diagram showing a target operation point retrieval map. (Embodiment)

As shown in FIG. 8, the target engine operation point setting means 17E has a target operation point retrieval map.

The motor torque instruction value operating means 17F calculates the torque instruction value (motor torque instruction value) of each of the first motor generator 4 and the second motor generator 5 serving as a plurality of motor generators by using a torque balance equation including a target engine torque which is obtained from the target engine operation point and an electric power balance equation including the target charge/discharge power.

The motor torque instruction value operating means 17F sets a feedback correction amount into the torque instruction value of each of the first motor generator 4 and the second motor generator 5 so as to converge the actual engine rotational speed to the target engine rotational speed which is obtained from the target engine operation point. In this case, the feedback correction amount which is set into the torque instruction value of each of the first motor generator 4 and the second motor generator 5 serving as a plurality of motor generators can be also set on the basis of a gear ratio or lever ratio of the power transmission mechanism 9 having the four rotational elements coupled with the first motor generator 4, second motor generator 5, drive axis 8, and internal combustion engine 2 in association with each other.

Further, the motor torque instruction value operating means 17F calculates the rotational speed of each of the first motor generator 4 and the second motor generator 5 from the target engine rotational speed which is obtained from the target engine operation point and the vehicle speed, calculates the torque instruction value of the first motor generator 4 on the basis of the rotational speeds of the first motor generator 4 and the second motor generator 5, the target charge power, and the target engine torque, and calculates the torque instruction value (motor torque instruction value) of the second motor generator 5 on the basis of the torque instruction value of the first motor generator 4 and the target engine torque.

That is, in the embodiment, in such a hybrid vehicle that the output of the internal combustion engine 2 and the motive powers of the first motor generator 4 and the second motor generator 5 are synthesized and the drive axis 8 connected to the drive wheel 6 is driven, the target drive power is obtained from a target drive force which is required by the driver in order to drive the vehicle at the target vehicle speed, the generation power is obtained on the basis of the charge state (SOC) of the battery 18, the target engine power is obtained by adding the generation power to the target drive power, the target engine operation point is obtained from the target engine power, the target electric power is obtained from a difference between the target drive power and the target engine power, and the torque instruction values of the first motor generator 4 and the second motor generator 5 are arithmetically operated from the torque balance equation including the target engine torque and the electric power balance equation including the target electric power.

Subsequently, the arithmetic operations for obtaining the target engine operation point (target engine rotational speed, target engine torque) from the accelerator opening degree and the vehicle speed will be described on the basis of a flowchart of FIG. 2 and a control block diagram of FIG. 4.

Figure 2:
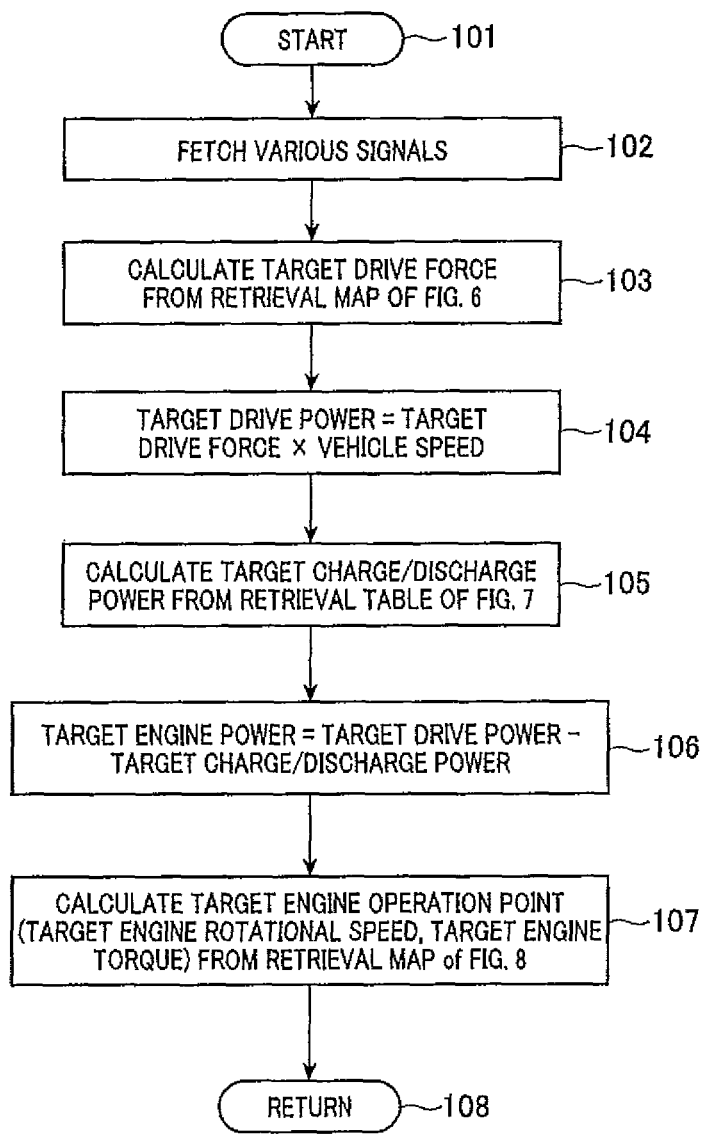
FIG. 2 is a flowchart for calculating a target engine operation point. (Embodiment)

As shown in FIG. 2, when a program of the control means 17 is started (step 101), first, various kinds of signals (accelerator opening degree, vehicle speed, charge state (SOC)) which are used for control are fetched (step 102). A target drive force according to the accelerator opening degree and the vehicle speed is calculated from a target drive force retrieval map shown in FIG. 6 (step 103). In this case, a high vehicle speed region where the accelerator opening degree is equal to zero (0) is set to a negative value so as to obtain a drive power in the decelerating direction corresponding to an engine brake. On the other hand, in a region where the vehicle speed is low, it is set to a positive value so that a creep run can be performed.

By multiplying the target drive force and the vehicle speed, a target drive power necessary to drive the vehicle by the target drive force is set (step 104).

Further, in order to control the charge state (SOC) of the battery 18 so as to lie within a normal use range, the target charge/discharge power is calculated from a target charge/discharge amount retrieval table shown in FIG. 7 (step 105). In this case, when the charge state (SOC) of the battery 18 is low, by increasing the charge power, an over discharge of the battery 18 is prevented. When the charge state (SOC) of the battery 18 is high, by increasing the discharge power, an overcharge is prevented. For convenience of explanation, the discharge side is handled as a positive value and the charge side is handled as a negative value.

The target engine power to be output by the internal combustion engine 2 is calculated from the target drive power and the target charge/discharge power (step 106). The target engine power to be output by the internal combustion engine 2 is set to a value obtained by adding a power adapted to charge the battery 18 to the power necessary to drive the hybrid vehicle (in the case of the discharge, by subtracting). In this case, since the charge side is handled as a negative value, the target engine power is calculated by subtracting the target charge/discharge power from the target drive power.

The target engine operation point (target engine rotational speed, target engine torque) according to the target engine power and the vehicle speed is calculated from the target engine operation point retrieval map shown in FIG. 8 (step 107). The program is returned (step 108).

In the above target engine operation point retrieval map, as shown in FIG. 8, a point where the whole efficiency obtained by adding an efficiency of a power transmission system constructed by the power transmission mechanism 9, first motor generator 4, and second motor generator 5 to an efficiency of the internal combustion engine 2 is improved is selected at every power on an equal power line, and a line obtained by connecting the selected points is set as a target operation point line. The target operation point line is set at every vehicle speed. Such a set value may be experimentally obtained or may be obtained by calculating from the efficiencies of the internal combustion engine 2, first motor generator 4, and second motor generator 5.

The target operation point line is set so as to be shifted to a high rotational speed side as the vehicle speed rises. This is because of the following reasons.

Figure 9:
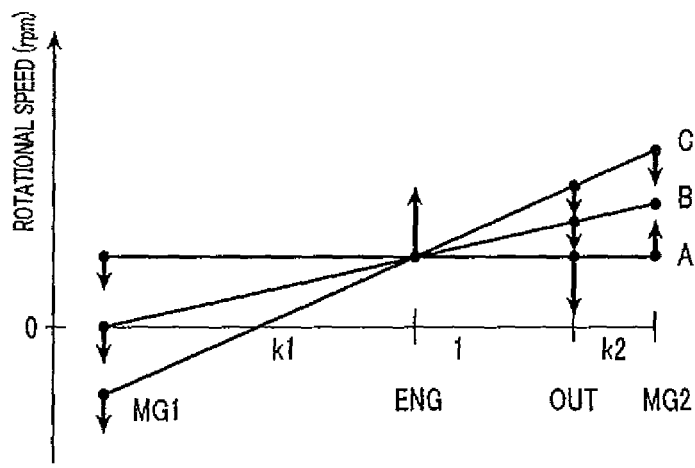
FIG. 9 is a collinear diagram in the case where a vehicle is changed at the same engine operation point. (Embodiment)

In the case where the same engine operation point is set to the target engine operation point irrespective of the vehicle speed, as shown in FIG. 9, when the vehicle speed is low, the rotational speed of the first motor generator 4 is positive, the first motor generator 4 becomes a generator, and the second motor generator 5 becomes an electric motor (state of A in FIG. 9). As the vehicle speed rises, the rotational speed of the first motor generator 4 approaches zero (0) (state of B in FIG. 9). When the vehicle speed further rises, the rotational speed of the first motor generator 4 becomes negative. In this state, the first motor generator 4 operates as an electric motor and the second motor generator 5 operates as a generator (state of C in FIG. 9).

When the vehicle speed is low (state of A and state of B in FIG. 9), since a circulation of the power does not occur, the target operation point is close to a point where the engine efficiency is mainly high like a target operation point line of the vehicle speed =40 km/h shown in FIG. 8.

However, when the vehicle speed is high (state of C in FIG. 9), the first motor generator 4 operates as an electric motor, the second motor generator 5 operates as a generator, and the power circulation occurs, so that the efficiency of the power transmission system deteriorates.

Figure 10:
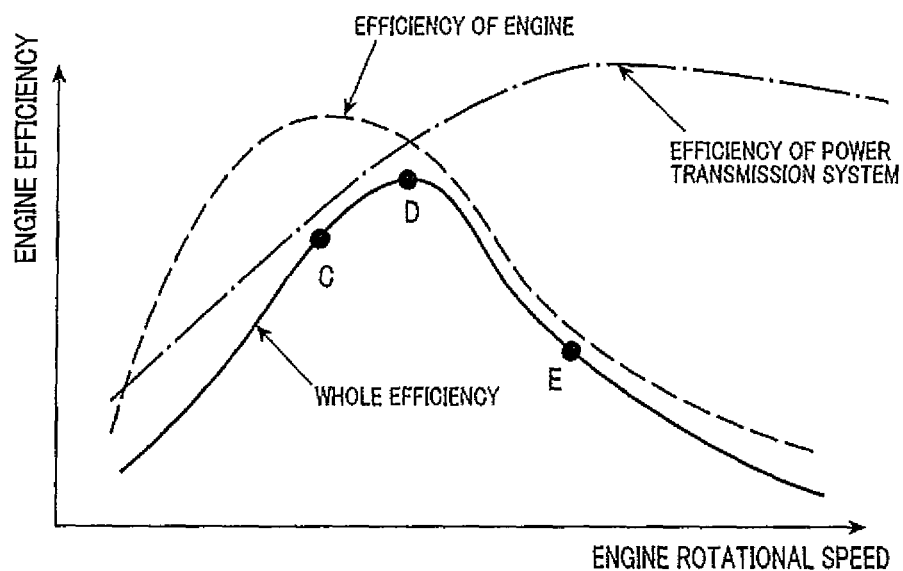
FIG. 10 is a diagram showing each efficiency state on an equal power line. (Embodiment)

Therefore, as shown at a point C in FIG. 10, even if the engine efficiency is high, since the efficiency of the power transmission system deteriorates, the whole efficiency deteriorates.

Figure 11:
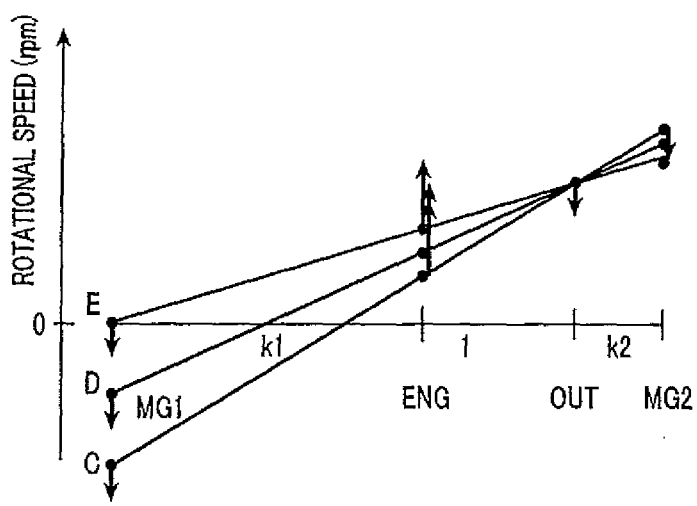
FIG. 11 is a collinear diagram showing each point (D, E, F) on an equal power line. (Embodiment)

Therefore, in order to prevent the power circulation from occurring in the high vehicle speed region, as shown at a point E of a collinear diagram shown in FIG. 11, it is desirable to set the rotational speed of the first motor generator 4 to zero (0) or higher. However, if doing so, since the engine operation point is shifted to such a direction that the engine rotational speed rises, as shown at a point E in FIG. 10, even if the efficiency of the power transmission system is raised, the engine efficiency deteriorates largely. Thus, the whole efficiency deteriorates.

Therefore, as shown in FIG. 10, a point where the whole engine efficiency is high is a point D between both of them. If such a point D is set to the target engine operation point, the most efficient driving can be performed.

Figure 12:
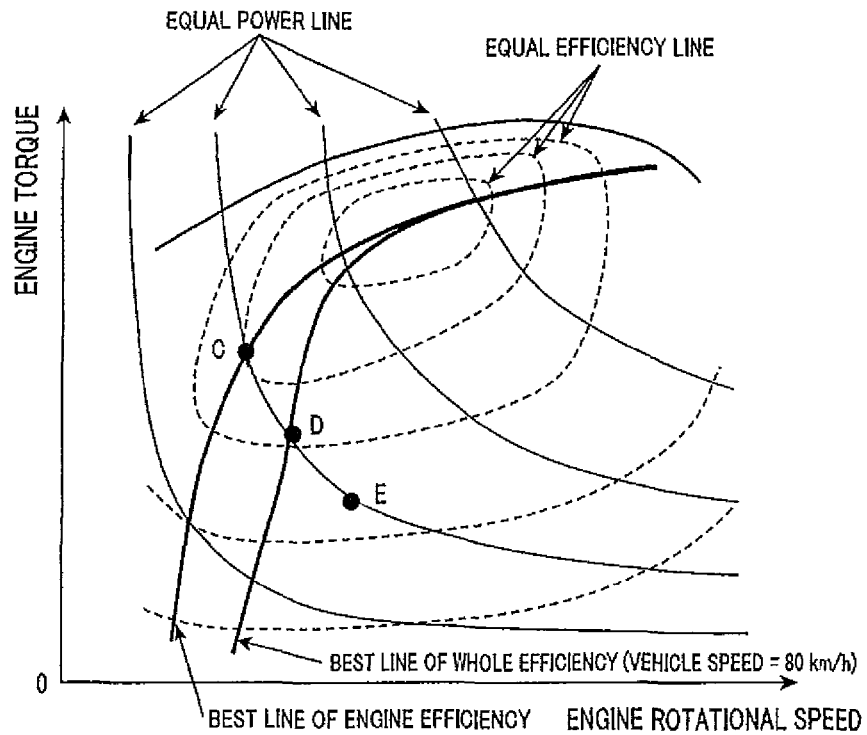
FIG. 12 is a diagram showing a best line of an engine efficiency and a best line of a whole efficiency. (Embodiment)

The three operation points of C, D, and E mentioned above are plotted on a target operation point retrieval map as shown in FIG. 12. In FIG. 12, naturally, the engine operation point where the whole efficiency is best when the vehicle speed is high is shifted to the higher rotational speed side than that at the operation point where the engine efficiency is best.

Figure 5:
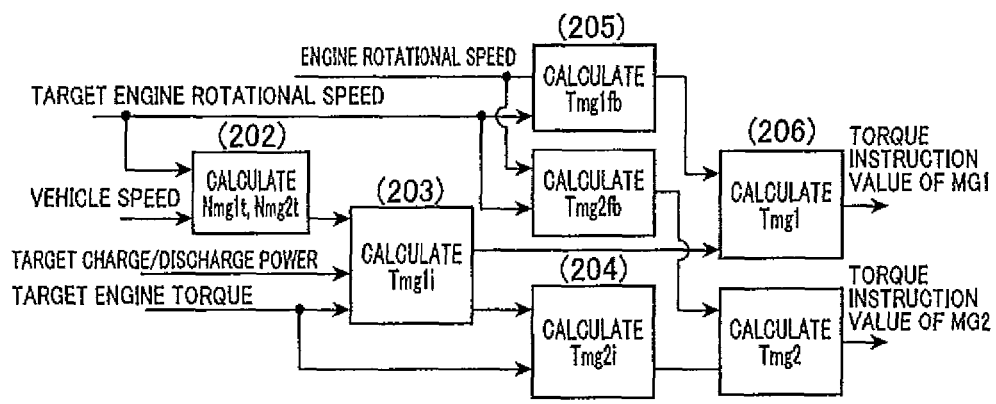
FIG. 5 is a control block diagram for calculating the torque instruction value. (Embodiment)

Subsequently, arithmetic operations of the target torques of the first motor generator 4 and the second motor generator 5 for setting a charge/discharge amount of the battery to a target value while outputting the target drive force will be described on the basis of a flowchart of FIG. 3 and a control block diagram of FIG. 5.

Figure 3:
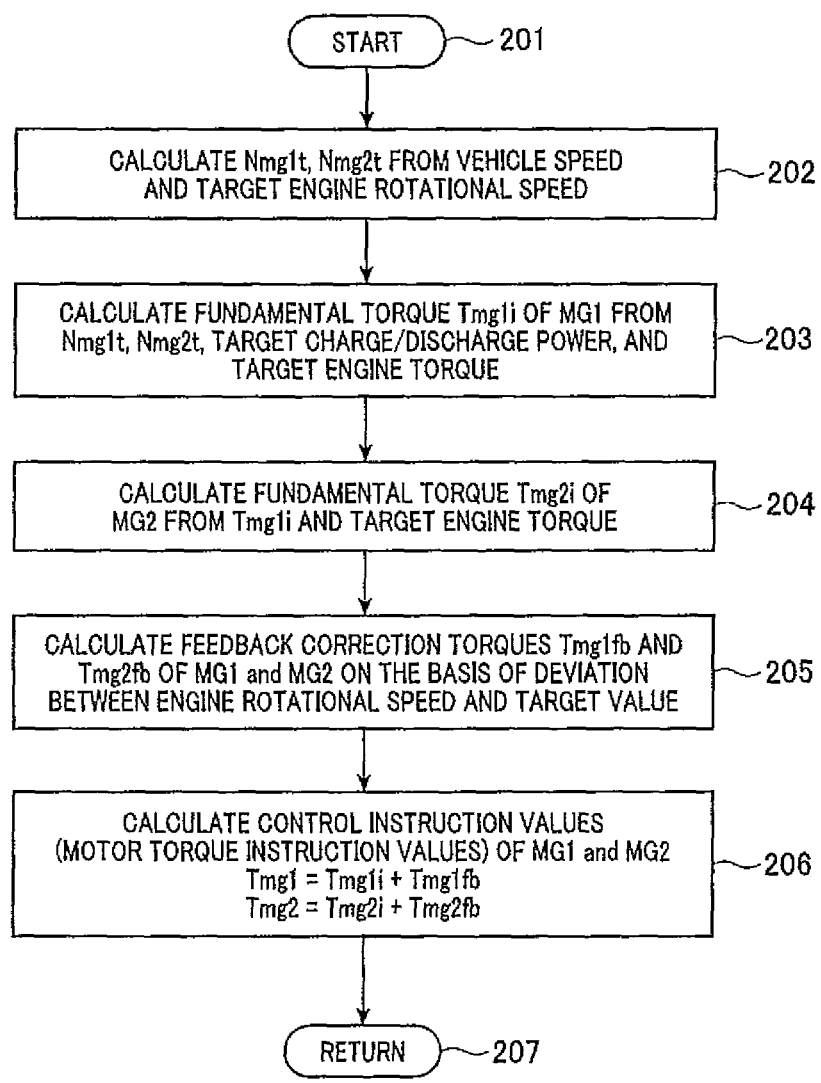
FIG. 3 is a flowchart for calculating a torque instruction value. (Embodiment)

As shown in FIG. 3, when the program of the control means 17 is started (step 201), first, rotational speeds No of the first planetary gear mechanism 19 and the second planetary gear mechanism 20 are calculated from the vehicle speed and a rotational speed $Nmg1t$ of the first planetary gear mechanism 19 and a rotational speed $Nmg2t$ of the second planetary gear mechanism 20 in the case where the engine rotational speed has reached a target engine rotational speed Net are calculated (step 202). The rotational speed $Nmg1t$ of the first planetary gear mechanism 19 and the rotational speed $Nmg2t$ of the second planetary gear mechanism 20 are calculated by the following (equation 1) and (equation 2). These arithmetic operation equations are obtained from a relation between the rotational speeds of the first planetary gear mechanism 19 and the second planetary gear mechanism 20.

$$Nmg1t=(Net-No)*k1+Net \quad \text{(equation 1)}$$

$$Nmg2t=(No-Net)*k2+No \quad \text{(equation 2)}$$

In the above (equation 1) and (equation 2), as shown in FIG. 9, k1: Lever ratio between the first motor generator (MG1) and the engine (ENG) in the case where a distance between the engine (ENG) and the drive axis (OUT) is set to "1"

k2: Lever ratio between the drive axis (OUT) and the second motor generator (MG2) in the case where a distance between the engine (ENG) and the drive axis (OUT) is set to "1"

That is, k1 and k2 are values which are decided by a gear ratio of the first planetary gear mechanism 19 and the second planetary gear mechanism 20.

A fundamental torque $Tmg1i$ of the first motor generator 4 is calculated from the rotational speed $Nmg1t$ of the first motor generator 4, the rotational speed $Nmg2t$ of the second motor generator 5, a target charge/discharge power Pbatt, and a target engine torque Tet (step 203). The fundamental torque $Tmg1i$ is calculated by the following calculation equation (3).

$$Tmg1i=(Pbatt*60/2\pi-Nmg2t*Tet/k2)/(Nmg1t+Nmg2t*(1+k1)/k2) \quad \text{(equation 3)}$$

This equation (3) can be obtained by solving simultaneous equations of the following (torque balance equation) (shown by the following "equation (4)") showing a balance of the torques which are input to the first planetary gear mechanism 19 and the second planetary gear mechanism 20 and the following (electric power balance equation) (shown by the following "equation (5)") showing that the electric power which is generated or consumed by the first motor generator 4 and the second motor generator 5 and an input/output electric power (Pbatt) to/from the battery 18 are equal.

$$Tet+(1+k1)*Tmg1=k2*Tmg2 \quad \text{(equation 4)}$$

$$Nmg1*Tmg1*2\pi/60+Nmg2*Tmg2*2\pi/60=Pbatt \quad \text{(equation 5)}$$

In the torque balance equation, as shown by the above (equation 4), the target torques and the target engine torques of the first motor generator 4 and the second motor generator 5 are balanced on the basis of a lever ratio based on a gear ratio of the power transmission mechanism 9 for mechanically and operationally coupling the first motor generator 4, second motor generator 5, and internal combustion engine 2.

Subsequently, a fundamental torque $Tmg2i$ of the second motor generator 5 is calculated from the fundamental torque $Tmg1i$ and the target engine torque by the following (equation 6) (step 204).

$$Tmg2i=(Tet+(1+k1)*Tmg1i)/k2 \quad \text{(equation 6)}$$

This (equation 6) is derived from the above equation (4).

Subsequently, in order to allow the engine rotational speed to approach the target, a deviation between the engine rotational speed and the target value is multiplied by a preset predetermined feedback gain, thereby calculating a feedback correction torque $Tmg1fb$ of the first motor generator 4 and a feedback correction torque $Tmg2fb$ of the second motor generator 5 (step 205).

The feedback correction torque $Tmg1fb$ of the first motor generator 4 is calculated by $$Tmg1fb=-\Delta Te/(1+k1)$$

where, $\Delta Te$ denotes a change amount to the target torque of the engine torque based on the torque balance equation.

The feedback correction torque $Tmg2fb$ of the second motor generator 5 is calculated by $$Tmg2fb=(k1/(1+k2))*Tmg1fb$$

The feedback correction torques $Tmg1fb$ and $Tmg2fb$ are added to the fundamental torques $Tmg1i$ and $Tmg2i$, thereby calculating a torque instruction value $Tmg1$ of the first motor generator 4 and a torque instruction value $Tmg2$ of the second motor generator 5 (step 206).

The torque instruction value $Tmg1$ of the first motor generator 4 is calculated by $$Tmg1 = Tmg1i + Tmg1fb$$

The torque instruction value $Tmg2$ of the second motor generator 5 is calculated by $$Tmg2 = Tmg2i + Tmg2fb$$

By driving and controlling the first motor generator 4 and the second motor generator 5 by the calculated torque instruction values $Tmg1$ and $Tmg2$, the charge/discharge to/from the battery 18 can be set to a target value while outputting the target drive force.

After that, the program is returned (step 207).

Collinear diagrams in typical operation states are shown in FIGS. 13 to 16.

where, k1 and k2 are defined as follows.
  k1=ZR1/ZS1
  k2=ZS2/ZR2
where,
  ZS1: The number of teeth of the first sun gear
  ZR1: The number of teeth of the first ring gear
  ZS2: The number of teeth of the second sun gear
  ZR2: The number of teeth of the second ring gear Each operation state will be described by using the collinear diagrams of FIGS. 13 to 16.

In the collinear diagrams of FIGS. 13 to 16, the rotational speed is defined in such a manner that the rotating direction of the internal combustion engine 2 is set to the positive direction and the torque which is input/output to/from each axis is defined in such a manner that the direction in which the torque in the same direction as that of the torque of the internal combustion engine 2 is input is positive. Therefore, a case where the torque of the drive axis is positive corresponds to a state where the torque adapted to drive the vehicle rearwardly is output (deceleration at the time of forward movement; driving at the time of backward movement). On the other hand, a case where the torque of the drive axis is negative corresponds to a state where the torque adapted to drive the vehicle forwardly is output (driving at the time of forward movement; deceleration at the time of backward movement).

In the case of performing the power generation or power running (by applying the motive power to the front wheels (drive wheels), the acceleration is performed; or a balancing speed is held in an up-grade) by the first motor generator 4 and the second motor generator 5, a loss is caused by a heat generation in the first inverter 15 and the second inverter 16 or in the first motor generator 4 and the second motor generator 5. Therefore, the efficiency in the case of performing a conversion between an electric energy and a mechanical energy is not equal to 100%. However, for simplicity of description, an explanation will be made on the assumption that there is no loss. is sufficient to control so as to additionally power-generate by an amount of energy which is lost by the loss.

Figure 13:
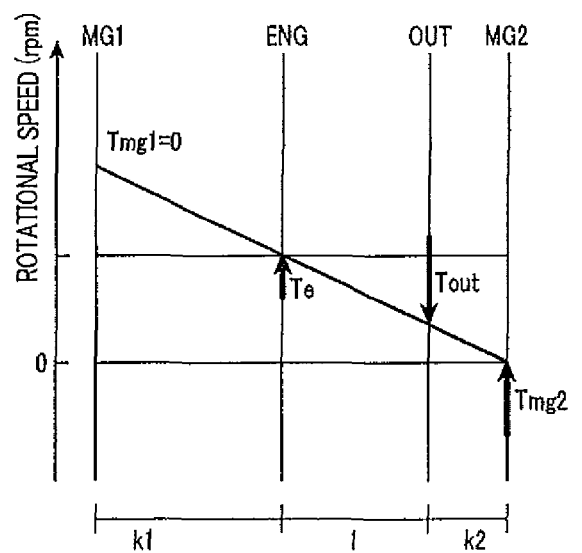
FIG. 13 is a collinear diagram of a LOW gear ratio state. (Embodiment)

(1) LOW Gear Ratio State (Refer to FIG. 13)

A state where the vehicle runs by the internal combustion engine 2 and the rotational speed of the second motor generator 5 is equal to zero (0). A collinear diagram at this time is shown in FIG. 13. Since the rotational speed of the second motor generator 5 is equal to zero (0), no electric power is consumed. Therefore, when there is no charge/discharge to/from the battery 18, since there is no need to perform the power generation in the first motor generator 4, the torque instruction value $Tmg1$ of the first motor generator 4 is equal to zero (0). A ratio between the engine rotational speed and the rotational speed of the drive axis 8 is equal to $(1+k2)/k2$.

Figure 14:
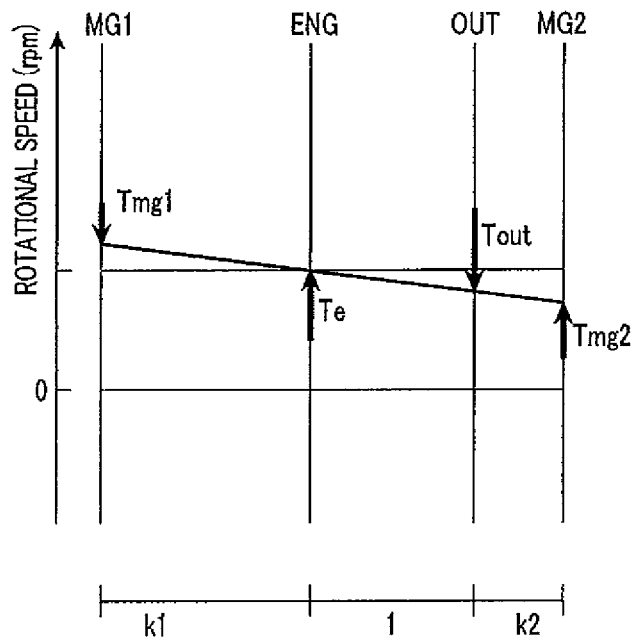
FIG. 14 is a collinear diagram of an intermediate gear ratio state. (Embodiment)

(2) Intermediate Gear Ratio State (Refer to FIG. 14)

A state where the vehicle runs by the internal combustion engine 2 and the rotational speeds of the first motor generator 4 and the second motor generator 5 are positive. A collinear diagram at this time is shown in FIG. 14. When there is no charge/discharge to/from the battery 18, the first motor generator 4 performs a regeneration and the second motor generator 5 is allowed to perform the power running by using this regenerated electric power.

Figure 15:
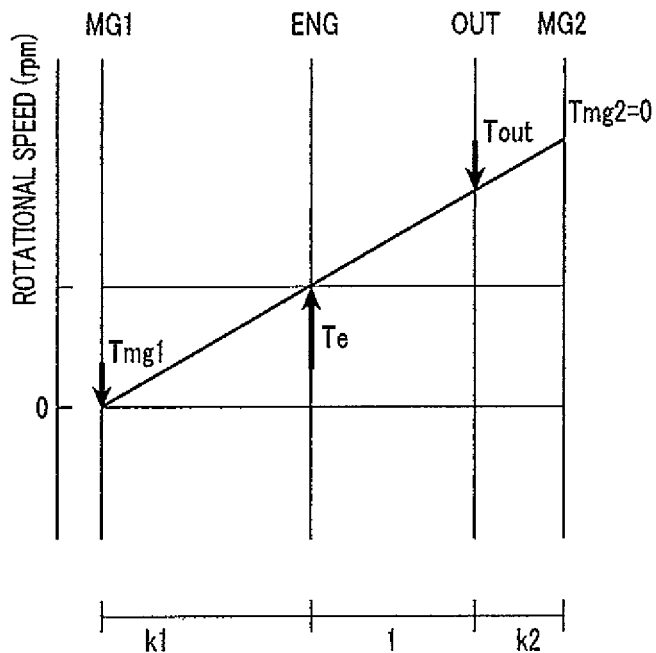
FIG. 15 is a collinear diagram of a HIGH gear ratio state. (Embodiment)

(3) HIGH Gear Ratio State (Refer to FIG. 15)

A state where the vehicle runs by the internal combustion engine 2 and the rotational speed of the first motor generator 4 is equal to zero (0). A collinear diagram at this time is shown in FIG. 15. Since the rotational speed of the first motor generator 4 is equal to zero (0), the regeneration is not performed. Therefore, when there is no charge/discharge to/from the battery 18, the power running or regeneration is not performed in the second motor generator 5 and the torque instruction value $Tmg2$ of the second motor generator 5 is equal to zero (0). A ratio between the engine rotational speed and the rotational speed of the drive axis is equal to $k1/(1+k1)$.

Figure 16:
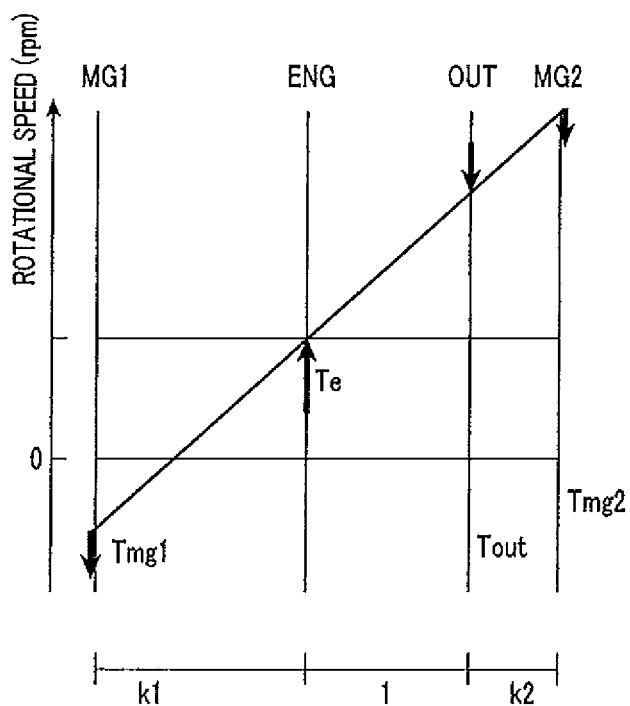
FIG. 16 is a collinear diagram of a state where a motive power circulation has occurred. (Embodiment)

(4) State where a Motive Power Circulation has Occurred (Refer to FIG. 16)

In the state where the vehicle speed is further higher than that in the HIGH gear ratio state in FIG. 15, the vehicle enters a state where the first motor generator 4 rotates reversely. In this state, the first motor generator 4 performs the power running and an electric power is consumed. Therefore, when there is no charge/discharge to/from the battery 18, the second motor generator 5 performs a regeneration and performs a power generation.

Although the embodiment of the invention has been described above, the construction of the foregoing embodiment is applied to each claim and will be described.

First, in the invention (1), the motor torque instruction value operating means 17F of the control means 17 calculates the torque instruction value of each of the plurality of motor generators 4 and 5 by using the torque balance equation including the target engine torque which is obtained from the target engine operation point and the electric power balance equation including the target charge/discharge power.

Thus, the control of the plurality of motor generators 4 and 5 in the case where there is a charge/discharge to/from the battery 18 can be performed. Both of assurance of the target drive force and assurance of the target charge/discharge can be satisfied in consideration of the operation point of the internal combustion engine (engine operation point).

In the invention (2), the motor torque instruction value operating means 17F of the control means 17 sets the feedback correction amount into the torque instruction value of each of the plurality of motor generators 4 and 5 so as to converge the actual engine rotational speed to the target engine rotational speed which is obtained from the target engine operation point.

Thus, by finely correcting the torque instruction value of each of the plurality of motor generators 4 and 5, the engine rotational speed can be rapidly converged to the target value. Since the engine operation point can be matched with the target operation point, the proper operation state can be set.

In the invention (3), the motor torque instruction value operating means 17F of the control means 17 calculates the rotational speed of each of the plurality of motor generators 4 and 5 from the target engine rotational speed which is obtained from the target engine operation point and the vehicle speed, calculates the torque instruction value of the first motor generator 4 among the plurality of motor generators on the basis of the rotational speeds of the plurality of motor generators 4 and 5, the target charge power, and the target engine torque, and calculates the torque instruction value of the second motor generator 5 among the plurality of motor generators on the basis of the torque instruction value of the first motor generator and the target engine torque.

Thus, since effects similar to those of (1) and (2) mentioned above are obtained and the torque instruction values of the plurality of motor generators 4 and 5 are individually calculated, the feedback correction can be also individually performed.

Industrial Applicability

The drive control apparatus according to the invention can be applied not only to the hybrid vehicle but also to other electric vehicles such as an electric car or the like.

REFERENCE SIGNS LIST

1 Drive control apparatus of hybrid vehicle
2 Internal combustion engine (ENG)
4 First motor generator (MG1)
5 Second motor generator (MG2)
6 Drive wheel
8 Drive axis (OUT)
9 Power transmission mechanism
15 First inverter
16 Second inverter
17 Control means
17A Target drive force calculating means
17B Target drive power setting means
17C Target charge/discharge power setting means
17D Target engine power calculating means
17E Target engine operation point setting means
17F Motor torque instruction value operating means
18 Battery
32 Accelerator opening degree detecting means
33 Vehicle speed detecting means
34 Battery charge state detecting means
35 Engine rotational speed detecting means

The invention claimed is:

1. A drive control apparatus of a hybrid vehicle for driving and controlling a vehicle by using outputs from an internal combustion engine and a plurality of motor generators, comprising:

an accelerator opening degree detector configured to detect an accelerator opening degree;
a vehicle speed detector configured to detect a vehicle speed;
a battery charge state detector configured to detect a charge state of a battery;
a target drive power setting device configured to set a target drive power on the basis of the accelerator opening degree detected by the accelerator opening degree detector and the vehicle speed detected by the vehicle speed detector;
a target charge/discharge power setting device configured to set a target charge/discharge power on the basis of at least the charge state of the battery detected by the battery charge state detecting detector;
a target engine power device configured to calculate a target engine power from the target drive power set by the target drive power setting device and the target charge/discharge power set by the target charge/discharge power setting device;
a target engine operation point setting device configured to set a target engine operation point from the target engine power calculated by the target engine power device and a whole system efficiency; and
a motor torque instruction value operating device configured to set a torque instruction value of each of the plurality of motor generators,
wherein the motor torque instruction value operating device is also configured to
calculate the rotational speed of each of the plurality of motor generators from the vehicle speed and the target engine rotational speed obtained by the target engine operation point,
calculate a torque instruction value of a first motor generator among the plurality of motor generators on the basis of the rotational speeds of the plurality of motor generators, the target charge power, and the target engine torque,
calculate a torque instruction value of a second motor generator among the plurality of motor generators on the basis of the torque instruction value of the first motor generator and the target engine torque, and
set a feedback correction amount into the torque instruction value of each of the plurality of motor generators so as to converge an actual engine rotational speed to the target engine rotational speed obtained from the target engine operation point.

\* \* \* \* \*